United States Patent
Hagino et al.

(10) Patent No.: US 10,744,644 B2
(45) Date of Patent: Aug. 18, 2020

(54) CALIBRATION JIG AND CALIBRATION METHOD FOR HORIZONTAL ARTICULATED ROBOT

(71) Applicant: TOYOTA JIDOSHA KABUSHIKI KAISHA, Toyota-shi, Aichi-ken (JP)

(72) Inventors: Tomotaka Hagino, Toyota (JP); Naoto Kagami, Toyota (JP); Yoichi Naruse, Nagoya (JP); Kaito Matsubara, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 337 days.

(21) Appl. No.: 15/850,640

(22) Filed: Dec. 21, 2017

(65) Prior Publication Data

US 2018/0178378 A1 Jun. 28, 2018

(30) Foreign Application Priority Data

Dec. 27, 2016 (JP) .................. 2016-254317

(51) Int. Cl.
| | |
|---|---|
| *B25J 9/16* | (2006.01) |
| *B25J 9/12* | (2006.01) |
| *B25J 9/10* | (2006.01) |
| *G01B 1/00* | (2006.01) |
| *G05B 19/23* | (2006.01) |

(Continued)

(52) U.S. Cl.
CPC ............ *B25J 9/1656* (2013.01); *B25J 9/101* (2013.01); *B25J 9/103* (2013.01); *B25J 9/126* (2013.01); *B25J 9/1692* (2013.01); *G01B 1/00* (2013.01); *E04B 2001/1993* (2013.01); *G05B 19/231* (2013.01); *G05B 19/42* (2013.01); *G05B 2219/50132* (2013.01); *G05B 2219/50151* (2013.01)

(58) Field of Classification Search
CPC ........ B25J 9/1656; B25J 9/1692; B25J 9/101; B25J 9/103; B25J 9/126; B25J 19/00; B25J 9/12; B25J 9/102; B25J 9/06; B25J 9/0096; B25J 9/1687; E04B 2001/1975; E04B 2001/1927; E04B 2001/1993; G05B 2219/50151; G05B 2219/50132; G05B 19/42; G05B 19/231; G01B 1/00
See application file for complete search history.

(56) References Cited

U.S. PATENT DOCUMENTS

| | | | |
|---|---|---|---|
| 4,831,549 A * | 5/1989 | Red ................. | B25J 9/1692 700/254 |
| 4,967,370 A | 10/1990 | Stern et al. | |

(Continued)

FOREIGN PATENT DOCUMENTS

| | | |
|---|---|---|
| JP | 63-251810 A | 10/1988 |
| JP | 07-290387 A | 11/1995 |

(Continued)

*Primary Examiner* — Jason Holloway
(74) *Attorney, Agent, or Firm* — Sughrue Mion, PLLC

(57) ABSTRACT

A calibration area has a rectangular area and a peripheral area. The rectangular area includes a center area provided in the center portion and a first corner area, a second corner area, a third corner area, and a fourth corner area that are set at four corners sequentially in the circumferential direction. The center area has a line symmetry with respect to each of the two orthogonal axes passing through the center of the rectangular area. The heights of the areas are different.

14 Claims, 12 Drawing Sheets

(51) Int. Cl.
    *G05B 19/42*     (2006.01)
    *E04B 1/19*     (2006.01)

(56) References Cited

U.S. PATENT DOCUMENTS

| | | | | |
|---|---|---|---|---|
| 5,177,563 | A * | 1/1993 | Everett | B25J 9/1692 |
| | | | | 356/621 |
| 5,929,584 | A | 7/1999 | Gunnarsson et al. | |
| 6,044,308 | A * | 3/2000 | Huissoon | B25J 9/1692 |
| | | | | 700/166 |
| 6,070,109 | A * | 5/2000 | McGee | B25J 9/1692 |
| | | | | 700/254 |
| 6,519,860 | B1 * | 2/2003 | Bieg | B23H 7/26 |
| | | | | 33/1 PT |
| 8,180,487 | B1 * | 5/2012 | Vangal-Ramamurthy | |
| | | | | B25J 9/1692 |
| | | | | 219/121.78 |
| 8,824,068 | B2 * | 9/2014 | Willis | G02B 7/003 |
| | | | | 353/119 |
| 2005/0166413 | A1 * | 8/2005 | Crampton | B25J 13/088 |
| | | | | 33/503 |
| 2010/0272348 | A1 * | 10/2010 | Pulla | G01B 21/04 |
| | | | | 382/154 |
| 2011/0085177 | A1 * | 4/2011 | Fukumoto | G01B 5/008 |
| | | | | 356/601 |
| 2018/0222056 | A1 * | 8/2018 | Suzuki | B25J 15/0014 |

FOREIGN PATENT DOCUMENTS

| | | |
|---|---|---|
| JP | 10-97311 A | 4/1998 |
| JP | 2011-67889 A | 4/2011 |

\* cited by examiner

CALIBRATION JIG AND CALIBRATION METHOD FOR HORIZONTAL ARTICULATED ROBOT

INCORPORATION BY REFERENCE

The disclosure of Japanese Patent Application No. 2016-254317 filed on Dec. 27, 2016 including the specification, drawings and abstract is incorporated herein by reference in its entirety.

BACKGROUND

1. Technical Field

The present disclosure relates to a calibration jig and a calibration method for a horizontal articulated robot.

2. Description of Related Art

As a calibration method for a horizontal articulated robot, Japanese Patent Application Publication No. 7-290387 (JP 7-290387 A) proposes a method in which three points which are arranged at right angles and the intervals of which are known are taught with the attitude of the end effector fixed and, then, one of the three points is taught with the attitude of the end effector changed.

SUMMARY

For the calibration of a horizontal articulated robot, teaching a plurality of positions increases the number of teaching positions with the result that accuracy is increased but, as the number of teaching position increases, the calibration requires a longer time. A method for efficiently calibrating a horizontal articulated robot has not yet been established.

A calibration jig proposed here has at least one calibration area at a predetermined position. The calibration area has a rectangular area that has a center at a predetermined position and a peripheral area that is set in a predetermined area around the rectangular area. The rectangular area has a first corner area, a second corner area, a third corner area, a fourth corner area, and a center area. The first corner area, the second corner area, the third corner area, and the fourth corner area are sequentially set at four corners of the rectangular area in a circumferential direction. The center area is delimited from the first corner area, the second corner area, the third corner area, and the fourth corner area each by a boundary line and is provided in a center portion of the rectangular area. In addition, the center area has a line symmetry with respect to each of two axes that pass through the center of the rectangular area and are orthogonal to each other and parallel to sides on a boundary of the rectangular area. The first corner area, the second corner area, the third corner area, the fourth corner area, the center area, and the peripheral area are set respectively to different predetermined heights.

The rectangular area may be a square. The center area may be a rhombus that has diagonal lines along two axes that pass through the center and that are orthogonal to each other and are parallel to the sides. The center area may be a circle. The first corner area, the second corner area, the third corner area, and the fourth corner area may each be a sector. The rectangular area may be a rectangle and the center area may be an ellipse having a long axis and a short axis along two axes that are orthogonal to each other and are horizontal to the sides. In the calibration area, a height of the peripheral area may be the highest and a height of the center area may be the lowest.

A calibration method for a horizontal articulated robot proposed here is a calibration method for a horizontal articulated robot including an articulated mechanism that includes an attachment unit for attaching a hand and a control device that controls a movement of the articulated mechanism. The calibration method includes preparing any one of the calibration jigs described above, arranging the calibration jig at a predetermined position with respect to the horizontally articulated robot, preparing a hand including a distance measuring sensor, attaching the hand to the attachment unit of the horizontal articulated robot, measuring a height of a surface of a calibration area with the distance measuring sensor by controlling the attachment unit with the control device, and calibrating control of the control device based on the measured height of the surface of the calibration area.

For example, when measuring the height of the surface of the calibration area, the height of the surface the calibration area may be measured so that the distance measuring sensor crosses at least a center area and a peripheral area of the calibration area. When calibrating the control of the control device, the center area or the peripheral area may be identified and, based on a height of the identified center area or peripheral area, a reference height is calibrated. By doing so, the control in the height can be calibrated.

For example, after calibrating the reference height, controlling the distance measuring sensor so that the height of the surface of the calibration area is measured along a straight line that crosses the calibration area at a predetermined angle may be included. In this case, calibrating control in the angle based on measured values measured by the distance measuring sensor in the controlling the distance measuring sensor may be included. By doing so, the control in the angle can be calibrated.

In addition, after calibrating the control in the angle, controlling the distance measuring sensor so that the height of the surface of the calibration area is measured along a straight line that is parallel to one of sides on a boundary of the rectangular area and that crosses the rectangular area may be included. In this case, a reference position in a direction along the one of the sides can be calibrated based on measured values measured by the distance measuring sensor in the controlling the distance measuring sensor.

In addition, after calibrating the reference position in the direction along the one side, measuring the height of the surface of the calibration area across the rectangular area along the one side while shifting a position into a direction orthogonal to the one side and then searching for a position where distances across the corner areas in the rectangular area and on both sides of the center area each become zero based on the height of the surface of the calibration area may be included. In this case, a reference position in a direction orthogonal to the one side can be calibrated based on the position where the distances across the corner areas each become zero.

In addition, in preparing the hand, the distance measuring sensor of the prepared hand may be a non-contact two-dimensional sensor that detects a shape of a measurement target along one straight line. In this case, the height of the surface of the calibration area along the straight line can be measured quickly and accurately since the non-contact two-dimensional sensor that detects the shape of a measurement target along one straight line is used.

In this case, after calibrating the reference height and before calibrating the control in the angle, controlling the non-contact two-dimensional sensor so that the height of the surface of the calibration area can be measured along a straight line that crosses at least corner areas included in the rectangular area and arranged diagonally and then detecting an orientation of the non-contact two-dimensional sensor based on measured values measured by the non-contact two-dimensional sensor in the controlling the distance measuring sensor may be included. By doing so, it is possible to confirm whether the orientation of the non-contact two-dimensional sensor is proper.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is an enlarged plan view of a calibration area 40a;

FIG. 5 is a V-V cross sectional view of the calibration area 40a;

FIG. 7 is a plan view showing an example of measurement positions in the process of measuring the height of the surface of the calibration area 40a;

DETAILED DESCRIPTION OF EMBODIMENTS

Figure 1:
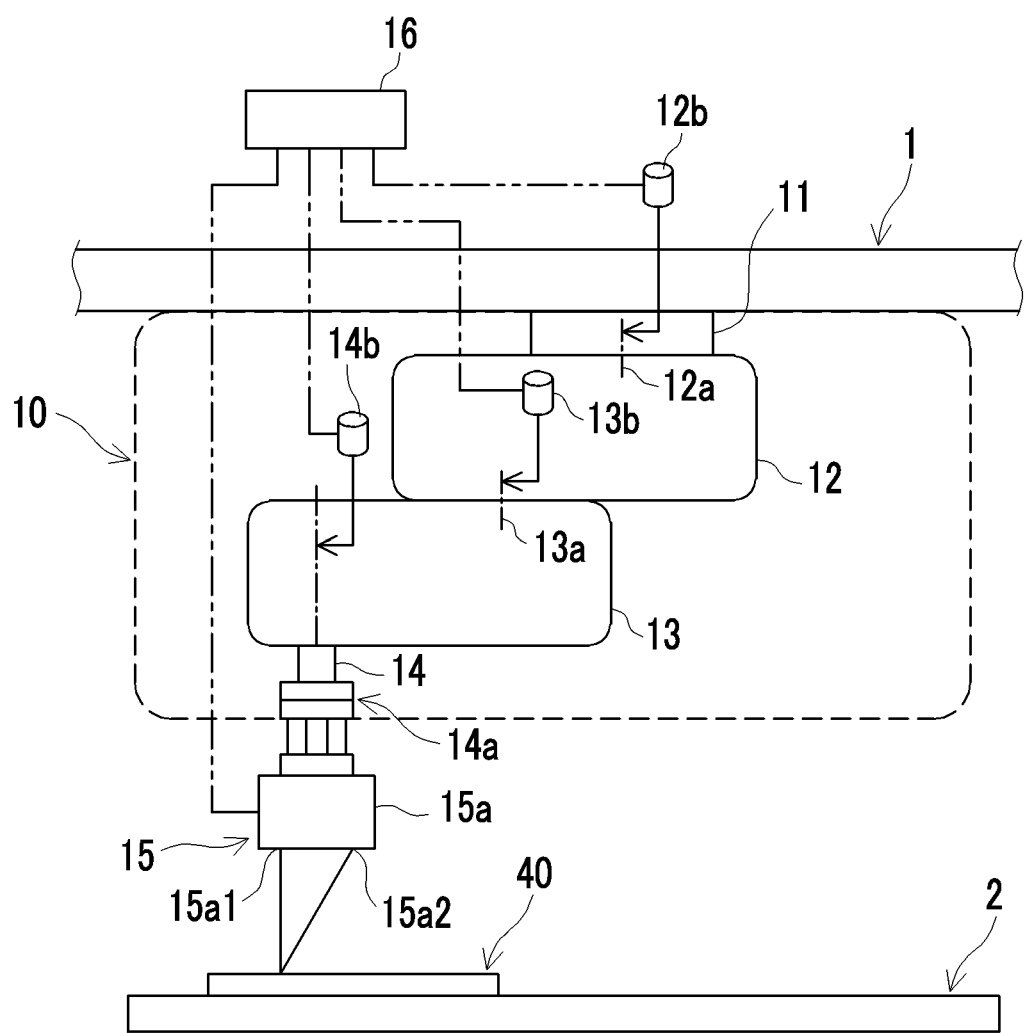
FIG. 1 is a schematic diagram of a horizontal articulated robot.

One embodiment of a calibration jig and a calibration method for a horizontal articulated robot proposed by the present disclosure will be described. The embodiment described below is, of course, not intended to limit the present disclosure in particular. The present disclosure is not limited to the embodiment described below unless otherwise stated. In the description below, the same reference numerals are attached, as necessary, to the components or parts that perform the same operation, and redundant description are omitted.

FIG. 1 is a schematic diagram of a horizontal articulated robot (also referred to as SCARA robot). FIG. 1 shows a suspension-type horizontal articulated robot suspended from a ceiling 1. In addition to a suspension-type horizontal articulated robot, an installation-type horizontal articulated robot is also available. A horizontal articulated robot to which the calibration jig and calibration method proposed by the present disclosure are applied is not limited to a suspension-type horizontal articulated robot.

A horizontal articulated robot 10 shown in FIG. 1 includes a base 11, a first arm 12, a second arm 13, a movable shaft 14, a hand 15, and a control device 16.

The base 11 is installed fixedly on the ceiling. On the base 11, a rotary shaft 12a of the first arm 12, extending in the vertical direction, is rotatably supported. The first arm 12, arranged below the base 11, is installed in such a way that it is horizontally rotatable around the rotary shaft 12a. The first arm 12 is provided with a drive mechanism and an actuator 12b for rotating the first arm 12. A rotary shaft 13a of the second arm 13, extending in the vertical direction, is rotatably supported on the tip of the first arm 12. The second arm 13, arranged below the first arm 12, is installed in such a way that it is horizontally rotatable around the rotary shaft 13a supported on the tip of the first arm 12. The second arm 13 is provided with a drive mechanism and an actuator 13b for rotating the second arm 13.

In this configuration, the driving mechanism and the actuator 12b of the first arm 12 are attached to the rotary shaft 12a, and the driving mechanism and the actuator 13b of the second arm 13 are attached to the rotary shaft 13a, respectively. Although schematically depicted in FIG. 1, a combination of a gear, a pinion, a servomotor, and so on may be used for the drive mechanism and the actuator 12b of the first arm 12 and for the drive mechanism and the actuator 13b of the second arm 13.

The movable shaft 14 is attached to the tip of the second arm 13. The movable shaft 14, extending in the vertical direction, is attached to the tip of the second arm 13 in such a way that it is movable in the vertical direction. An attachment unit 14a for attaching a sensor and the hand 15 is provided at the tip of the movable shaft 14. A drive mechanism and an actuator 14b for moving the movable shaft 14 are provided at the tip of the second arm 13. Although schematically depicted in FIG. 1, a mechanism composed of a combination of a ball screw mechanism and a servomotor can be used for the drive mechanism and the actuator 14b of the movable shaft 14.

Various industrial robot hands can be attached to the hand 15 provided at the tip of the movable shaft 14. The horizontal articulated robot 10 can be used, for example, for assembling precision parts. In this case, it is desirable that the hand 15 be operated with high accuracy. In the example shown in FIG. 1, the hand 15 is provided with a measuring instrument 15a having a distance measuring sensor as the calibration hand. In this embodiment, a laser measuring instrument using a laser (more specifically, a non-contact two-dimensional sensor) is used for the distance measuring sensor. A non-contact two-dimensional sensor employed here, which uses a noncontact inspection method implemented, for example, by a laser, is a sensor that applies a laser along one straight line to measure the shape of a workpiece to be measured along that straight line. For example, as a noncontact two-dimensional sensor described above, the LJ-V 7000 series (for example, LJ-V 7060) manufactured by Keyence Corporation can be used.

In the example shown in FIG. 1, the triangular distance measuring method is used for the measuring instrument 15*a* attached to the hand 15. The measuring instrument 15*a* includes a laser transmitter 15*a*1 and a laser receiver 15*a*2. The laser emitted from the transmitting unit 15*a*1 is reflected by the surface of a calibration jig 40 and is captured by the laser receiving unit 15*a*2. Then, the measurement data measured by the measuring instrument 15*a* is sent to the control device 16. The distance measuring method used for the distance measuring sensor is not limited to the triangular distance measuring method. Although the measuring instrument 15*a* having a non-contact two-dimensional sensor for calibrating the horizontal articulated robot 10 is used in this embodiment, the measuring instrument 15*a* is not limited to the measuring instrument with this configuration. For example, a distance measuring sensor in which the inspection position is a simple point may be used for the measuring instrument 15*a*. In this case, by moving the inspection position along the straight line, the shape of the workpiece to be measured can be measured along that straight line.

The control device 16 is a device that controls the actuator 12*b* of the first arm 12, the actuator 13*b* of the second arm 13, the actuator 14*b* of the movable shaft 14, and the hand 15. The control device 16 controls the operation of the horizontal articulated robot 10 according to the predetermined program.

In the horizontal articulated robot 10, the horizontal coordinate position of the movable shaft 14 at which the hand 15 is attached is determined by controlling the angle of the first arm 12 and the angle of the second arm 13 based on forward kinematics. In addition, the height of the hand 15 is controlled by controlling the height in accordance with the vertical position of the movable shaft 14 with respect to the second arm 13. Conversely, when the three-dimensional position to which the hand 15 is to be moved is determined, the angle of the first arm 12 and the angle of the second arm 13 are determined based on the inverse kinematics. Therefore, the control device 16 can move the hand 15 to a desired position by moving the first arm 12 and the second arm 13 according to the angle determined for the position to which the hand 15 is to be moved. In this way, within a predetermined movement range centered on the rotary shaft 12*a* of the first arm 12 provided on the base 11, the hand 15 of the horizontal articulated robot 10 is moved to a proper position.

Meanwhile, in the horizontal articulated robot 10 described above, the position of the hand 15 is delicately deviated due to a backlash in the driving mechanism or a deflection in the first arm 12 and the second arm 13. An operation at a working site sometimes requires working accuracy, for example, when small parts are pinched or assembled with high accuracy. For this reason, it is necessary to calibrate the control performed by the control device 16 so that the hand 15 can be operated with high accuracy at the site.

The calibration method for the horizontal articulated robot 10 proposed by the present disclosure uses a calibration jig 40 as shown in FIG. 1. The calibration jig 40 is placed on a work table 2 so that calibration jig 40 faces the hand 15 in the operating range of the hand 15.

Figure 2:
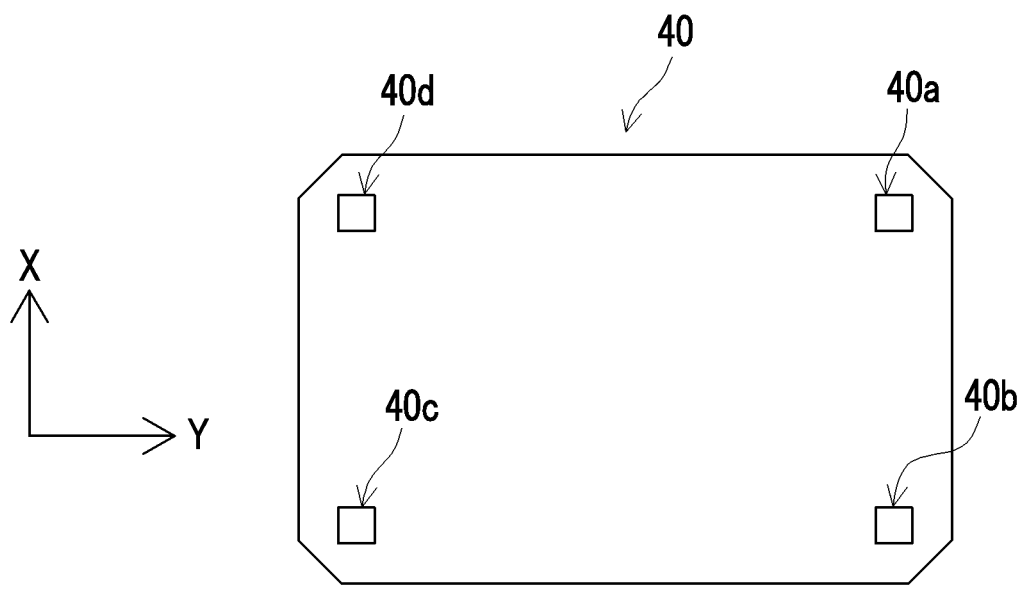
FIG. 2 is a plan view of a calibration jig 40.
Figure 3:
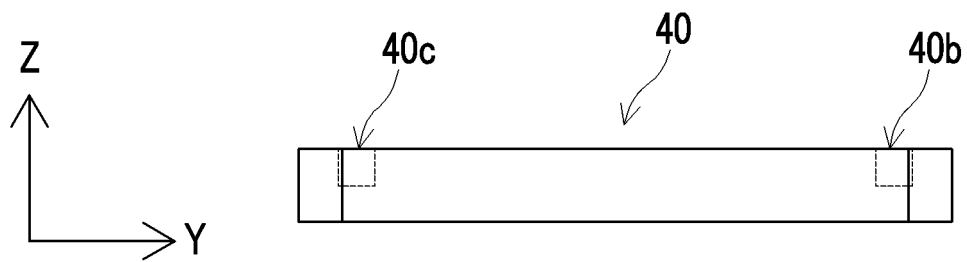
FIG. 3 is a side view of the calibration jig 40.

This calibration jig 40 has at least one calibration area at a predetermined position. FIG. 2 is a plan view of the calibration jig 40. FIG. 3 is a side view of the calibration jig 40. In this embodiment, the calibration jig 40 is a substantially rectangular plate-like member as shown in FIG. 2. The calibration jig 40 has a size large enough to be able to face the hand 15 in the operating range of the hand 15 of the horizontal articulated robot 10. As shown in FIG. 1, the calibration jig 40 is placed at a predetermined position on the work table 2, which is set in the operating range of the hand 15 of the horizontal articulated robot 10, so that the calibration jig 40 faces the hand 15.

Figure 4:
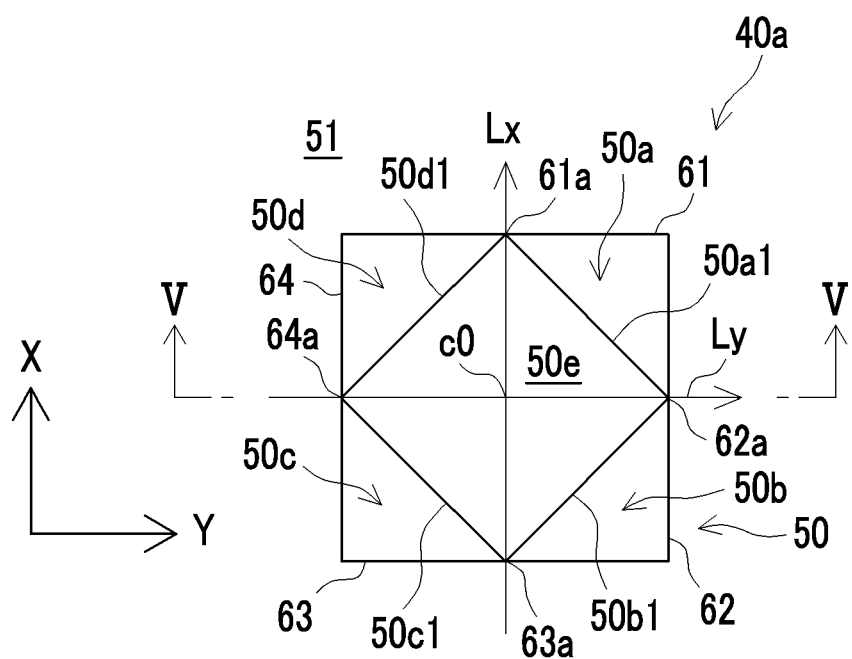
Figure 5:
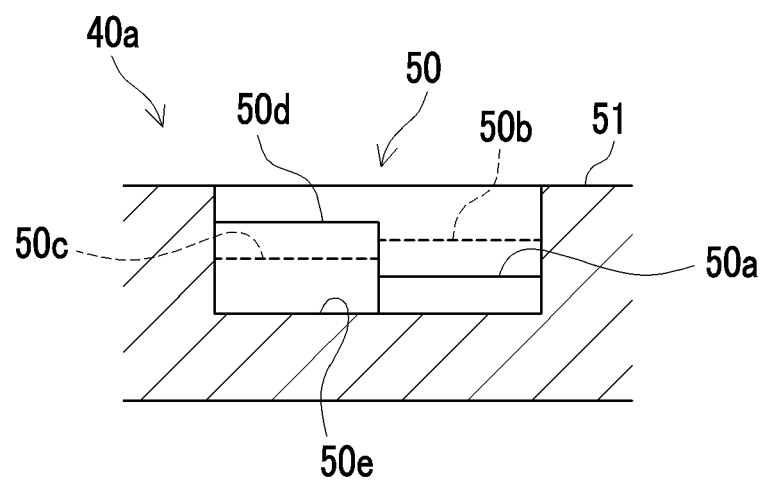

As shown in FIG. 2, calibration areas 40*a* to 40*d* are provided at four corners, one calibration area for each corner, on one surface (the surface facing the hand 15) of the calibration jig 40. FIG. 4 is an enlarged plan view of the calibration area 40*a*. FIG. 5 is a V-V cross sectional view of the calibration area 40*a*. The calibration area 40*a* will be described below. Although not shown, the calibration areas 40*a* to 40*d* have a similar shape.

The calibration area 40*a* has two areas: a rectangular area 50 and a peripheral area 51. The center c0 of the rectangular area 50 is set at a predetermined position in each of the calibration areas 40*a* to 40*d*. The peripheral area 51 is set in a predetermined area around the rectangular area 50.

The rectangular area 50 includes a first corner area 50*a*, a second corner area 50*b*, a third corner area 50*c*, a fourth corner area 50*d*, and a center area 50*e*. The first corner area 50*a*, the second corner area 50*b*, the third corner area 50*c*, and the fourth corner area 50*d* are set sequentially at the four corners of the rectangular area 50 in the circumferential direction. The center area 50*e* is delimited from the first corner area 50*a*, the second corner area 50*b*, the third corner area 50*c*, and the fourth corner area 50*d* with boundary lines 50*a*1 to 50*d*1, respectively. The center area 50*e* is provided at the center of the rectangular area 50. The center area 50*e* has line symmetry with respect to each of two orthogonal axes Lx and Ly each passing through the center c0 of the rectangular area 50 and parallel to the side forming the boundary of the rectangular area 50.

In this embodiment, the rectangular area 50 is a square area having sides 61 to 64 parallel to the two orthogonal axes Lx and Ly that pass through the center c0 of the rectangular area 50. The center area 50*e* is a square area the diagonal lines of which are set on the orthogonal two axes Lx and Ly passing through the center of the rectangular area 50 and which has its corners at the midpoints 61*a* to 64*a* of the sides 61 to 64 on the boundary of the rectangular area 50. That is, the center area 50*e* is a square that has diagonal lines inclined at 45 degrees with respect to the diagonal lines of the rectangular area 50 and is inscribed in the rectangular area 50.

The first corner area 50*a*, the second corner area 50*b*, the third corner area 50*c*, and the fourth corner area 50*d* are sequentially set in the four corners of the rectangular area 50 in the circumferential direction. In this embodiment, the first corner area 50*a* is set at the upper right, the second corner area 50*b* is set at the lower right, the third corner area 50*c* is set at the lower left, and the fourth corner area 50*d* is set at the upper left of the center area 50*e*. The peripheral area 51 is set around the rectangular area 50.

As described above, in this embodiment, the rectangular area 50 includes therein the square center area 50*e* whose center c0 is the same as that of the rectangular area 50, whose diagonal lines are inclined 45 degrees with respect to the diagonal lines of the rectangular area 50, and which is inscribed in the rectangular area 50. The first corner area 50*a*, the second corner area 50*b*, the third corner area 50*c*, and the fourth corner area 50*d* are provided sequentially at the four corners of the rectangular area 50 with the center area 50e as the boundary. Furthermore, the peripheral area 51 is set around the rectangular area 50.

As described above, one calibration area 40a of the calibration jig 40 includes the first corner area 50a, the second corner area 50b, the third corner area 50c, the fourth corner area 50d, the center area 50e, and the peripheral area 51. As shown in FIG. 5, the first corner area 50a, the second corner area 50b, the third corner area 50c, the fourth corner area 50d, the center area 50e, and the peripheral area 51 are set at predetermined heights different from each other. In this embodiment, the rectangular area 50 is recessed as a whole from the peripheral area 51. In addition, the center area 50e is the deepest. The first corner area 50a is next deeper, the third corner area 50c is next deeper, the second corner area 50b is next deeper, and the fourth corner area 50d is next deeper. In other words, with the height of the peripheral area 51 as the reference height, the areas of the calibration area 40a become deeper in the order of the fourth corner area 50d, the second corner area 50b, the third corner area 50c, the first corner area 50a, and the center area 50e. In FIG. 5, the heights of the second corner area 50b and the third corner area 50c are indicated by broken lines, respectively. The order of the depths (heights) of the areas of the calibration area 40a is not limited to this order. However, the height of each area of the calibration area 40a is set to a predetermined height, and the height should be a known height.

The rectangular area 50 of the calibration area 40a may have, for example, the side of 0.5 cm or more and 2 cm or less. One side of the center area 50e is preferably 0.3 cm or more and 1.5 cm or less. Such a calibration area 40a can be machined, for example, through machining by a machining center. In this case, the accuracy in the heights of the calibration area 40a, the peripheral area 51, and the areas 50a to 50e of the rectangular area 50 is preferably ±20 μm or less.

Next, the calibration method using this calibration jig 40 will be described. The calibration method proposed here is applied to a horizontal articulated robot having an articulated mechanism, which includes the attachment unit 14a for attaching the hand 15 as described above, and the control device 16 for controlling the movement of the articulated mechanism. The calibration method described here can be embodied, for example, as a process executed on the control device 16 in accordance with a predetermined program.

The calibration method proposed here includes the process of preparing the calibration jig 40, the process of arranging the calibration jig 40, the process of preparing the hand 15 for calibration, the process of attaching the hand 15 for calibration, the process of measuring the height of the surface of the calibration area 40a, and the process of calibrating the control of the control device 16.

Since the calibration jig 40 has already been described, the description of the prepared calibration jig 40 is omitted. In the process of arranging the calibration jig 40, the calibration jig 40 is arranged at a predetermined position with respect to the horizontal articulated robot 10. For example, the calibration jig 40 may be arranged in the operating range of the hand 15 of the horizontal articulated robot 10 so that the calibration area 40a faces the hand 15.

In the process of the preparing the hand 15 for calibration, the hand 15 equipped with the measuring instrument 15a such as the one described above is prepared. The hand 15 prepared here does not have to be dedicated to calibration. In the example shown in FIG. 1, a non-contact two-dimensional sensor is used as the distance measuring sensor of the measuring instrument 15a.

In the process of attaching the hand 15, the hand 15 is attached to the attachment unit 14a of the horizontal articulated robot 10. As shown in FIG. 1, the hand 15 for calibration is attached with the measuring instrument 15a (distance measuring sensor) facing the calibration jig 40 so that measuring instrument 15a can face the calibration jig 40 in the calibration area 40a.

In the process of measuring the height of the surface of the calibration area 40a, the attachment unit 14a is controlled by the control device 16 to allow the height of the surface of the calibration area 40a to be measured by the distance measuring sensor of the measuring instrument 15a. As described above, the calibration area 40a includes the first corner area 50a, the second corner area 50b, the third corner area 50c, the fourth corner area 50d, the center area 50e, and the peripheral area 51. The first corner area 50a, the second corner area 50b, the third corner area 50c, the fourth corner area 50d, and the center area 50e are set to predetermined heights (known heights) that are different from each other. In the process of measuring the height of the surface of the calibration area 40a, the height of the surface of the calibration area 40a is measured by the distance measuring sensor of the measuring instrument 15a along the straight line crossing the calibration area 40a.

In the process of calibrating the control of the control device 16, the control of the control device 16 is calibrated based on the measured height of the surface of the calibration area 40a. That is, in this embodiment, the calibration area 40a of the calibration jig 40 includes the first corner area 50a, the second corner area 50b, the third corner area 50c, and the fourth corner area 50d, and the center area 50e that are set to predetermined heights (known heights) that are different from each other. Therefore, by measuring the height of the surface of the calibration area 40a, it is possible to properly calibrate the control of the control device 16 in the height direction.

Furthermore, in this embodiment, the center area 50e, delimited from the first corner area 50a, the second corner area 50b, the third corner area 50c, and the fourth corner area 50d, respectively, with the boundary lines 50a1, 50b1, 50c1, and 50d1, is provided in the center of the rectangular area 50. In addition, the center area 50e has line symmetry with respect to each of the two orthogonal axes that pass through the center c0 of the rectangular area 50 and are parallel to the sides 61 to 64 on the boundary of the rectangular area 50. Therefore, by measuring the height of the surface of the calibration area 40a, it is possible to properly calibrate the control on the planar coordinate axes and coordinates in the operating range in the control device 16.

Figure 6A:
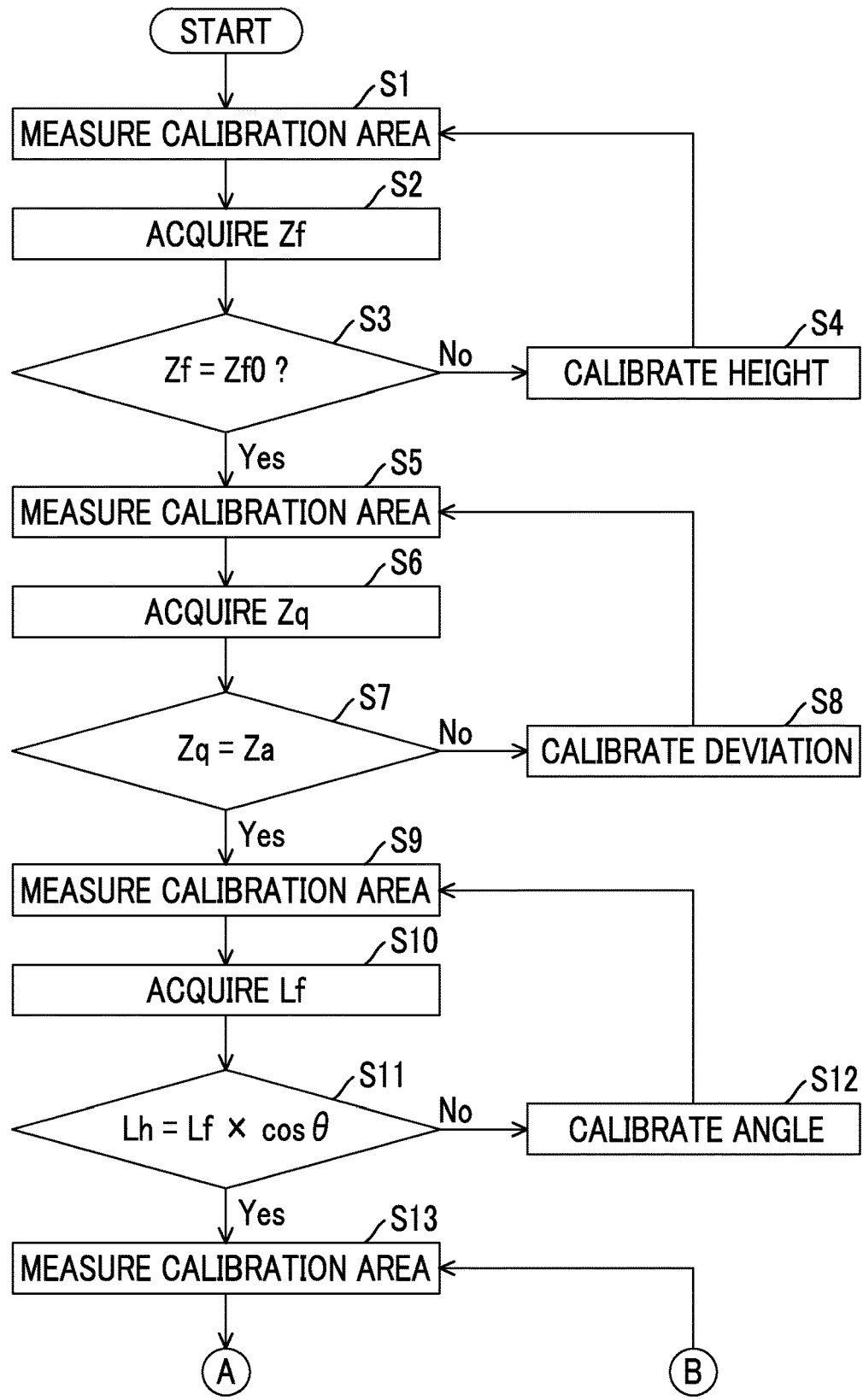
FIG. 6A is a part of a flowchart of a calibration method.
Figure 6B:
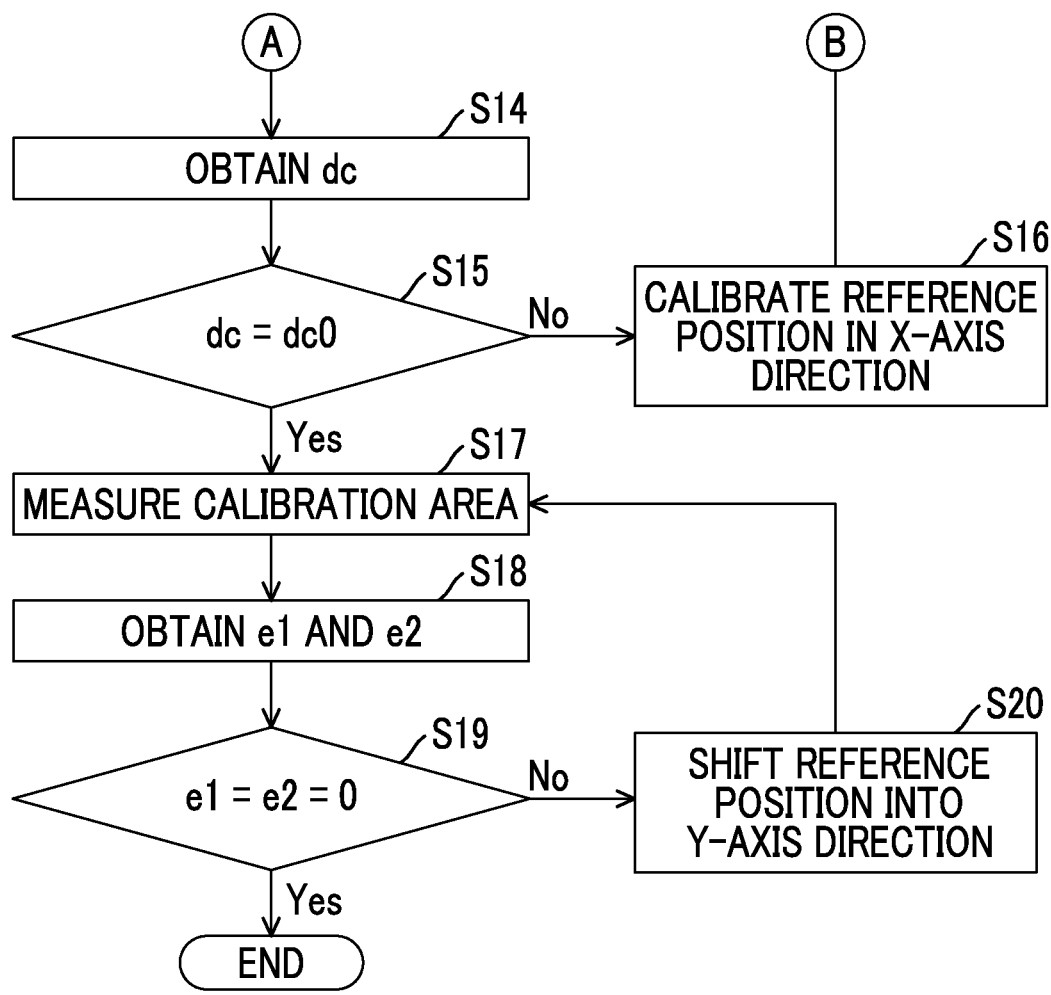
FIG. 6B is a part of the flowchart of the calibration method.
Figure 7:
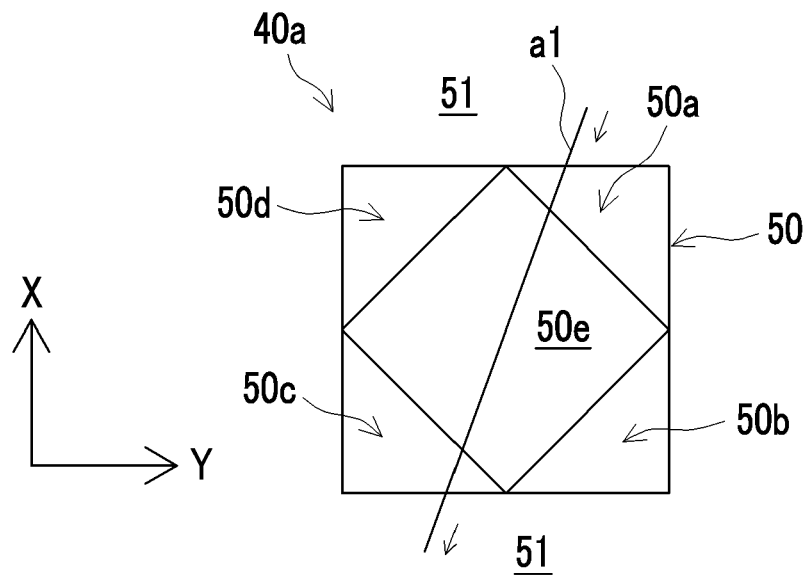
Figure 8:
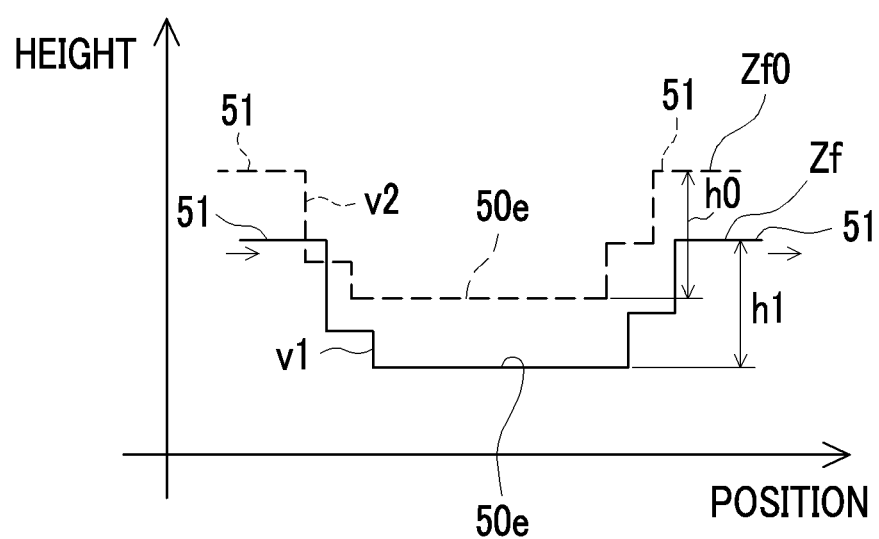
FIG. 8 is a graph showing the height of the surface of the calibration area 40a in the measurement.

FIGS. 6A and 6B are flowcharts of the calibration method exemplified in the description below. FIGS. 6A and 6B are joined by connectors A and B. FIG. 7 is a plan view showing an example of measurement positions in the process of measuring the height of the surface of the calibration area 40a. FIG. 8 is a graph showing the height of the surface of the calibration area 40a in the measurement. The exemplary calibration method will be described below by referring, as necessary, to the flowcharts shown in FIGS. 6A and 6B.

In this calibration method, the control in the height direction is first calibrated. In this case, as the process of measuring the height of the surface of the calibration area 40a, it is required that the height of the surface of the calibration area 40a be measured so that the distance measuring sensor crosses at least the center area 50e and the peripheral area 51 of the calibration area 40a as shown in FIG. 7. In the example shown in FIG. 7, the non-contact two-dimensional sensor detects the shape of the calibration jig 40, which is to be measured, along one straight line.

In this case, as shown in FIGS. 7 and 8, the height of the surface of the calibration area 40a is measured along a straight line a1 that crosses the center area 50e and the peripheral area 51. In this case, since the calibration area 40a has the shape as described above, the height is detected along the straight line a1 in the order of the peripheral area 51, the first corner area 50a, the center area 50e, the third corner area 50c, and the peripheral area 51. In FIG. 8, the horizontal axis indicates the positions along the straight line a1, and the vertical axis indicates the heights. In this case, before the control device 16 is calibrated, it is practically unknown along what straight line a1 (how the straight line a1 crosses the calibration area 40a) the heights were detected under the control of the control device 16. In other words, it is unknown how the detection line of the measuring instrument 15a crosses the calibration area 40a.

However, in most cases, the detection line of the measuring instrument 15a is deviated from the orthogonal two axes Lx, Ly (see FIG. 4) passing through the center c0 of the rectangular area 50. When the detection line of the measuring instrument 15a deviates from the orthogonal two axes Lx and Ly passing through the center c0 of the rectangular area 50, the detection line of the measuring instrument 15a passes through the peripheral area 51, the center area 50e, and the two corner areas. As a result, the four heights are detected along the detection line of the measuring instrument 15a. In this way, in most cases where the detection line of the measuring instrument 15a is deviated from the two axes Lx and Ly, the heights of the center area 50e and the peripheral area 51 can be detected at all times. For example, the heights are detected in the order of the peripheral area 51, the corner area, the center area 50e, the corner area, and the peripheral area 51. Since this order is known, the heights of the center area 50e and the peripheral area 51 can be identified at all times. Even when the detection line of the measuring instrument 15a coincides with the two axes Lx, Ly, the heights of the center area 50e and the peripheral area 51 can be detected at all times. In the calibration area 40a, the heights of the center area 50e and the peripheral area 51 are known. Therefore, it is possible to calibrate the reference height in the control in the height direction based on the height of the center area 50e or the peripheral area 51 that is one of the measured values.

For example, in FIG. 8, the solid line v1 indicates the measured values of the actually detected heights. The broken line v2 is the known heights of the center area 50e and the peripheral area 51 in the calibration area 40a. In this embodiment, the center area 50e is the lowest, and the peripheral area 51 is the highest, in the calibration area 40a. Therefore, based on the measured values of the heights detected when the solid line was actually detected before the calibration, it is possible to estimate the lowest position as the position of the center area 50e and the highest position as the position of the peripheral area 51. Furthermore, a difference h1 between the lowest measured value and the highest measured value is calculated. After that, it is determined whether the calculated difference h1 is equal to the known difference h0 in height between the peripheral area 51 and the center area 50e. If the difference h1 is equal to the known difference h0, the difference h1 between the measured values can be identified as the difference between the center area 50e and the peripheral area 51. After that, reference height can be calibrated based on the height of the center area 50e or the peripheral area 51 identified in this way. For example, it is required to calibrate the control in the height direction of the control device 16 so that the measured value Zf of the height of the peripheral area 51 becomes the known height of the peripheral area 51 (reference height Zf0).

In this calibration, the height of the surface of the calibration area 40a is measured along the predetermined straight line a1, for example, as shown in FIG. 6A (S1). At this time, the control device 16 identifies the peripheral area 51 and acquire the measured value Zf of the height of the peripheral area 51 (S2). Then, it is determined whether the measured value Zf of the height of the peripheral area 51 is equal to the reference height Zf0 (S3). If it is determined that the height Zf of the peripheral area 51 is equal to the reference height Zf0 (Zf=Zf0: Yes), the height control is determined to be proper and the processing proceeds to the next process. If it is determined that the height Zf of the peripheral area 51 is not equal to the reference height Zf0 (Zf≠Zf0: No), the control in the height is calibrated (S4). That is, in the calibration of the height (S4), the processing for calibrating the control in the height direction of the control device 16 is executed so that the measured value Zf of the height of the peripheral area 51 becomes equal to the known reference value Zf0. Thus, in the control in the height direction of the control device 16, the height of the peripheral area 51 is adjusted to the reference height Zf0.

In the flowcharts shown in FIGS. 6A and 6B, the height of the surface of the calibration area 40a is measured again after the calibration (S4) along the straight line a1 (S1). After that, the measured value Zf of the height of the peripheral area 51 is acquired (S2). Then, it is determined whether the measured value Zf is equal to the reference height Zf0 (S3). If Zf=Zf0, the processing proceeds to the next process on the assumption that the control in the height has been properly calibrated. If Zf=Zf0 is not satisfied (Zf≠Zf0), the calibration operation is retried on the assumption that the calibration of the control in the height is improper. Alternatively, though not shown, the calibration processing may be stopped. For example, the number of times it is determined that Zf≠Zf0 is counted and, if the number of times it is determined that Zf≠Zf0 becomes equal to a predetermined number of times (for example, twice), the calibration processing may be stopped and the notification may be sent to the operator that the calibration has been stopped.

In this embodiment, the distance measuring sensor of the hand 15, prepared in the process of preparing the hand 15, is a non-contact two-dimensional sensor that detects the shape of a measurement object along one straight line. In this case, the height of the surface of the calibration area 40a can be measured, with no movement or with a short movement of the hand 15 (the measuring instrument 15a), along the straight line that crosses the rectangular area 50. This distance measuring sensor reduces the time required for the measurement when measuring the height of the surface of the calibration area 40a.

Depending on the structure for attaching the hand 15 to the horizontal articulated robot 10, the orientation of the non-contact two-dimensional sensor may be deviated in the circumferential direction. For example, the orientation of the non-contact two-dimensional sensor may be deviated at a predetermined angle of 90 degrees or 180 degrees in the circumferential direction depending on the structure of the attachment unit 14a. In the description below, the straight line for detecting the shape of a target to be measured by the non-contact two-dimensional sensor is referred to, as necessary, as the "inspection line" of the non-contact two-dimensional sensor. The orientation of the non-contact two-dimensional sensor is the orientation (direction) of the inspection line. In this embodiment, as the next process after the control in the height is calibrated, the deviation in the orientation of the non-contact two-dimensional sensor, that is, the deviation in the orientation (direction) of the inspection line, is detected.

In this embodiment, the corner areas of different heights are provided at the four corners of the rectangular area 50 in the calibration area 40*a*. In such a case, the processing for confirming whether the orientation of the non-contact two-dimensional sensor is proper may be added after the reference height is calibrated. In this case, the non-contact two-dimensional sensor (measuring instrument 15*a*) is controlled so that the height of the surface of the calibration area 40*a* can be measured along a straight line crossing at least the diagonally arranged corner areas in the rectangular area 50. In this process, it is required to detect the orientation of the non-contact two-dimensional sensor based on the measured values measured by the non-contact two-dimensional sensor.

Figure 9:
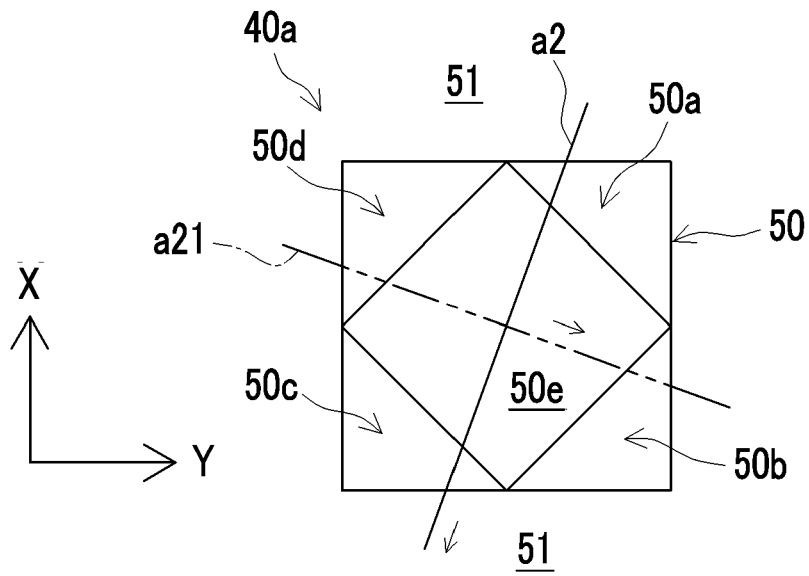
FIG. 9 is a plan view showing an example of measurement positions in the process of confirming the orientation of a non-contact two-dimensional sensor.
Figure 10:
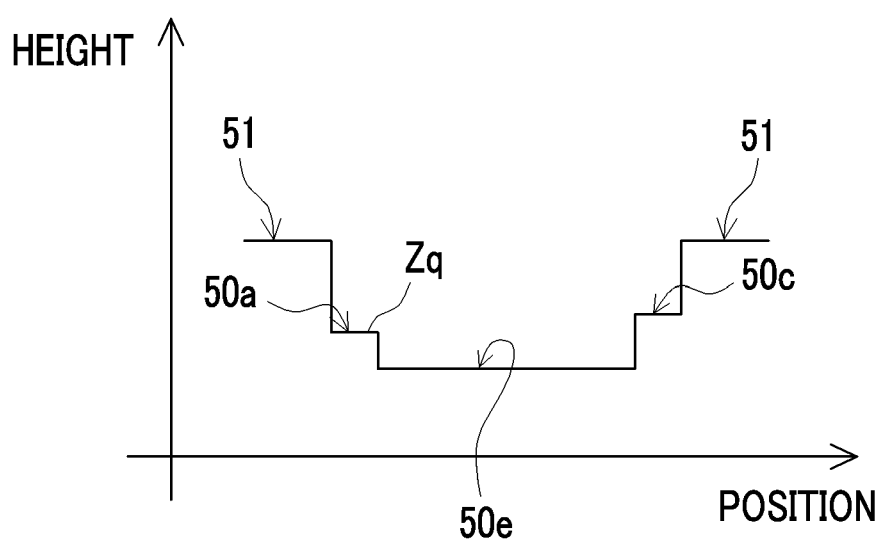
FIG. 10 is a graph showing the height of the surface of the calibration area 40a in the measurement.

FIG. 9 is a plan view showing an example of measurement positions in the process of confirming the orientation of the non-contact two-dimensional sensor. FIG. 10 is a graph showing the height of the surface of the calibration area 40*a* in the measurement.

For example, as shown in FIGS. 9 and 10, the height of the surface of the calibration area 40*a* is measured along a straight line a2 crossing the center area 50*e* and the peripheral area 51 (S5). When measuring the surface in this way, the control in the height direction has already been calibrated. Therefore, the height of each area of the calibration area 40*a* can be detected with the reference height (the height of the peripheral area 51 in this embodiment) as the reference. In this embodiment, the height Zq of a first corner area detected between the peripheral area 51 and the center area 50*e* is acquired (S6). Then, it is identified which corner area has been detected based on the acquired height Zq of that corner area and, then, it is determined whether there is a deviation in the orientation of the non-contact two-dimensional sensor (S7).

For example, when the inspection line of the non-contact two-dimensional sensor is set to the predetermined direction along the straight line a2, the heights corresponding to the known heights are detected along the straight line a2 in the order of the peripheral area 51, the first corner area 50*a*, the center area 50*e*, the third corner area 50*c*, and the peripheral area 51 as shown in FIG. 10. At this time, the height of each area is known. Therefore, when the non-contact two-dimensional sensor correctly crosses the rectangular area 50 in the same direction as that of the straight line a2, the heights of the peripheral area 51, the first corner area 50*a*, the center area 50*e*, the third corner area 50*c*, and the peripheral area 51 are detected along the straight line a2 in this order. In FIG. 10, the horizontal axis indicates the positions along the straight line a2 and the vertical axis indicates the heights.

However, if the inspection line is deviated in the circumferential direction, the heights are not detected in this order. For example, if the inspection line is deviated to the left 90 degrees with respect to the straight line a2 as shown by a straight line a21 in FIG. 9, the heights of the peripheral area 51, the fourth corner area 50*d*, the center area 50*e*, the second corner area 50*b*, and the peripheral area 51 are detected in this order. This means that the direction of the inspection line of the non-contact two-dimensional sensor can be identified based on the height Zq of the first corner area detected between the peripheral area 51 and the center area 50*e*.

For example, when the inspection line of the non-contact two-dimensional sensor is set to the predetermined direction along the straight line a2, it is required to determine whether the height Zq of the first corner area, which is detected between the peripheral area 51 and the center area 50*e*, is equal to the prescribed height Za of the first corner area 50*a*. If Zq=Za, the inspection line of the non-contact two-dimensional sensor is set to the predetermined direction and, therefore, it is determined that the sensor is not deviated. In this case, the processing may proceed to the next process.

On the other hand, if Zq≠Za, it is determined that the sensor is deviated. In this case, it is required to properly calibrate the deviation in the inspection line of the non-contact two-dimensional sensor (S8). To calibrate such a deviation, it is required to identify the deviation in the inspection line of the non-contact two-dimensional sensor based on the height Zq of the first corner area detected between the peripheral area 51 and the center area 50*e* and, based on the identified deviation, to calibrate the deviation in the inspection line.

For example, as shown in FIG. 9, when the inspection line is deviated counterclockwise 90 degrees with respect to the straight line a2 as indicated by a straight line a21, the heights are detected in the order of the peripheral area 51, the fourth corner area 50*d*, the center area 50*e*, the second corner area 50*b*, and the peripheral area 51. Similarly, when the inspection line is deviated 180 degrees with respect to the straight line a2, the heights are detected in the order of the peripheral area 51, the third corner area 50*c*, the center area 50*e*, the first corner area 50*a*, and the peripheral area 51. When the inspection line is deviated clockwise 90 degrees (270 degrees counterclockwise) with respect to the straight line a2, the heights are detected in the order of the peripheral area 51, the second corner area 50*b*, the center area 50*e*, the fourth corner area 50*d*, and the peripheral area 51. Therefore, if the height Zq of the first corner area, which is detected between the peripheral area 51 and the center area 50*e*, is equal to the height Zd of the fourth corner area 50*d* (Zq=Zd), it can be identified that the inspection line is deviated counterclockwise 90 degrees with respect to the straight line a2. Similarly, if the height Zq of the first corner area is equal to the height Zc of the third corner area 50*c* (Zq=Zc), it can be identified that the inspection line is deviated 180 degrees with respect to the straight line a2. Similarly, if the height Zq of the first corner area is equal to the height Zb of the second corner area 50*b* (Zq=Zb), it can be identified that the inspection line is deviated clockwise 90 degrees with respect to the straight line a2. In calibrating the deviation (S8), it is required to properly calibrate the inspection line of the non-contact two-dimensional sensor in this way based on the deviation in the inspection line identified.

To calibrate the deviation (S8), there is no need to re-attach the hand 15 to the attachment unit 14*a*; instead, the predetermined program should be used to correct the orientation of the hand 15, by which the orientation in terms of the control can be recognized, according to the deviation in the inspection line of the non-contact two-dimensional sensor. In other words, when the inspection line of the non-contact two-dimensional sensor is deviated, it is required to calibrate the inspection line direction of the non-contact two-dimensional sensor so that the deviated inspection line is correctly recognized.

In this embodiment, as shown in FIGS. 6A and 6B, the height of the surface of the calibration area 40*a* is measured again along the straight line a2 (S5) after the deviation in the inspection line of the non-contact two-dimensional sensor is calibrated. Next, the height Zq of the first corner area, which is detected between the peripheral area 51 and the center area 50*e*, is acquired (S6). Then, it is determined whether Zq=Za (S7). If Zq=Za, the processing should proceed to the next process on the assumption that the sensor is not deviated (Yes).

Figure 11:
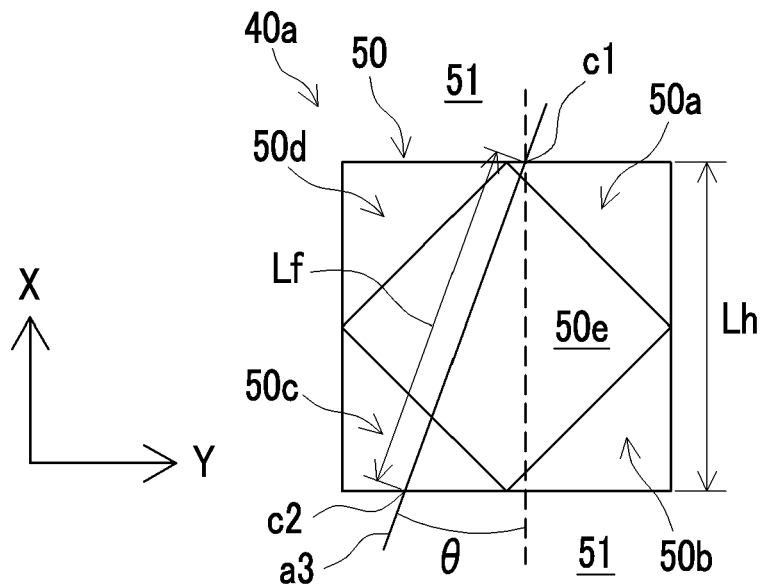
FIG. 11 is a plan view showing an example of measurement positions in the process of calibrating the control in the angle.
Figure 12:
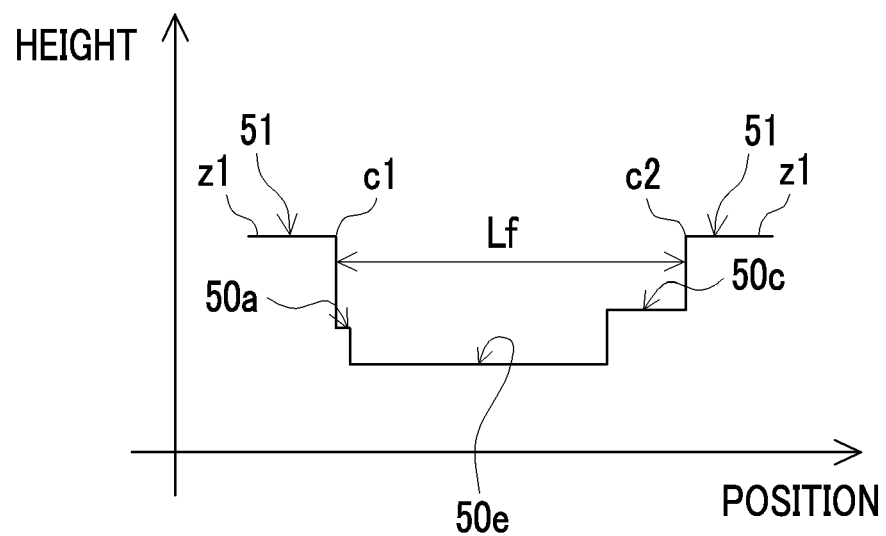
FIG. 12 is a graph showing the height of the surface of the calibration area 40a in the measurement.

Next, as the next process, the control in the angle is calibrated in this embodiment. FIG. 11 is a plan view showing an example of measurement positions in the process of calibrating the control in the angle. FIG. 12 is a graph showing the height of the surface of the calibration area 40*a* in the measurement.

In the calibration of the control in the angle, the measuring instrument 15*a* (see FIG. 1) is controlled so that the height of the surface of the calibration area 40*a* is measured along a straight line a3 crossing the calibration area 40*a* at a predetermined angle θ. Next, the control in the angle is calibrated based on the measured values measured by the measuring instrument 15*a* in the process of controlling the measuring instrument 15*a*. In this embodiment, the angle θ is defined by the angle with respect to the X-axis as shown in FIG. 11. Before the control in the angle is calibrated, it is unknown whether the straight line a3 is inclined accurately at the angle θ with respect to the X-axis. If the angle θ of the straight line a3 is not accurate, it is necessary to calibrate the control in the angle. In this calibration process, it is determined whether the controlled angle is proper and, when the angle is not proper, the control in the angle is calibrated.

In the process of calibrating the control in the angle, the height of the surface of the calibration area 40*a* is measured along the straight line a3 crossing the calibration area 40*a* at the predetermined angle θ as shown in FIG. 11 (S9: See FIG. 6A). When measuring the surface in this way, the control in the height direction has already been calibrated. In this process, the length Lf, over which the straight line a3 crosses the rectangular area 50, is acquired (S10) based on the known height z1 of the peripheral area 51. That is, as shown in FIG. 12, the distance from the position c1, where the height z1 of the peripheral area 51 is changed, to the position c2, which indicates the height z1 of the peripheral area 51 again, is obtained as the length Lf over which the straight line a3 crosses the rectangular area 50, based on the measured height of the surface of the calibration area 40*a*. In FIG. 12, the horizontal axis indicates the positions along the straight line a3 and the vertical axis indicates the heights of the surface of the calibration area 40*a*. Next, it is determined whether the angle is required to be calibrated (S11). The length Lh of one side of the rectangular area 50 is a known length. If the angle of the inspection line of the non-contact two-dimensional sensor is controlled to the proper angle θ, the expression of Lh=Lf×cos θ is satisfied. Therefore, it is determined whether the expression of Lh=Lf×cos θ is satisfied (S11). This determination determines whether the calibration of the control in the angle is required. If Lh=Lf×cos θ is satisfied (Yes) in the determination (S11), the calibration of the control in the angle is not required and the processing proceeds to the next process. if Lh=Lf×cos θ is not satisfied (No) in the determination (S 11), the processing for calibrating the control in the angle (S12) is executed.

In the processing for calibrating the control in the angle, the angle of the inspection line (that is, the straight line a3) of the non-contact two-dimensional sensor is adjusted so that Lf obtained in the previous measurement becomes equal to Lh/cos θ. Then, the teaching processing for storing the adjusted angle as θ is executed. Then, until it is determined that Lh=Lf×cos θ is satisfied (Yes) in the determination processing (S11), the processing is repeated from the processing for measuring the height of the surface of the calibration area 40*a* (S9) along the straight line a3 crossing the calibration area 40*a* at the predetermined angle θ to the processing for calibrating the angle (S12).

Figure 13:
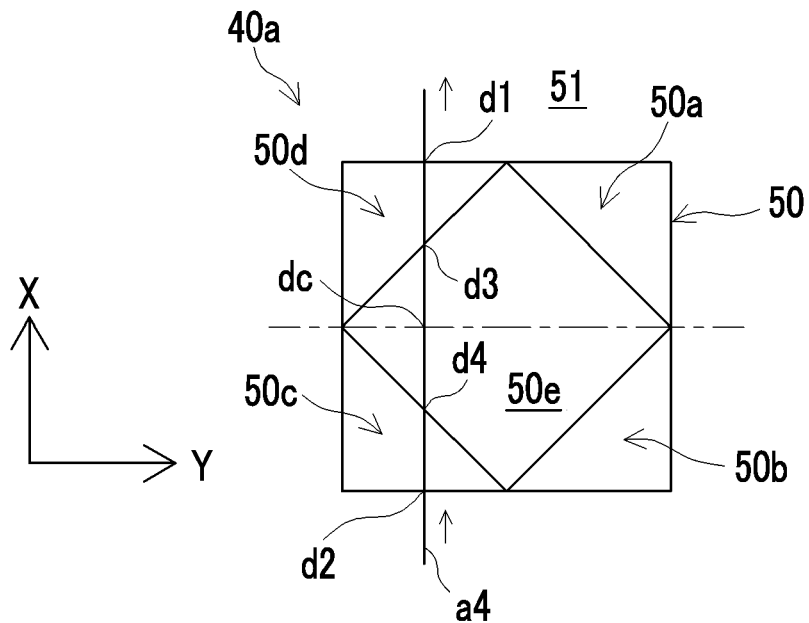
FIG. 13 is a plan view showing the measurement positions in the process of calibrating the reference position along the X-axis.
Figure 14:
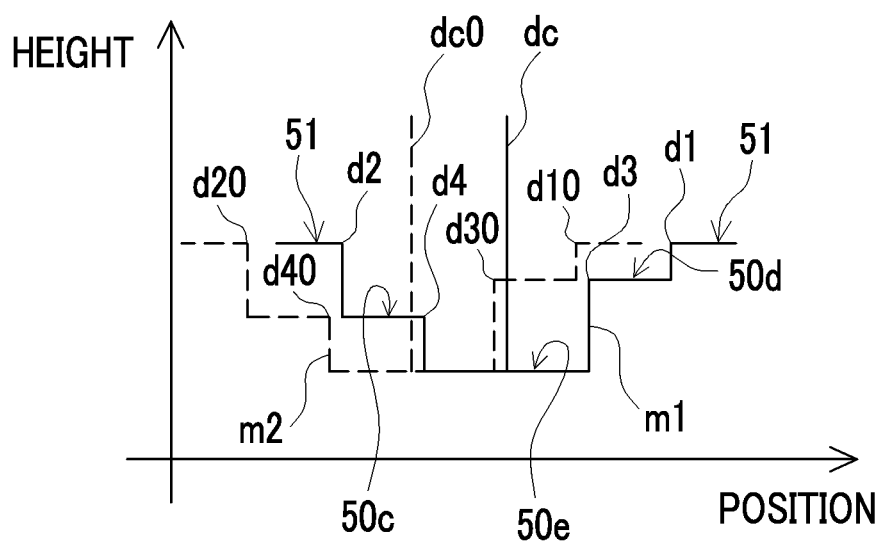
FIG. 14 is a graph showing the height of the surface of the calibration area 40a in the measurement.

Next, as the next process, the reference position in the X-axis direction along one of the sides 61 to 64, which form the boundary of the rectangular area 50, is calibrated in this embodiment. FIG. 13 is a plan view showing, as an example of such calibration, the measurement positions in the process of calibrating the reference position along the X-axis. FIG. 14 is a graph showing the height of the surface of the calibration area 40*a* in the measurement. In this process, it is determined whether the reference position in the X-axis direction is proper and, if it is not proper, the reference position in the X-axis direction is calibrated.

This calibration is performed after the angle has been calibrated. First, the measuring instrument 15*a* is controlled so that the height of the surface of the calibration area 40*a* can be measured along a straight line a4 that is parallel to one side 62 of the sides on the boundary of the rectangular area 50 (in other words, parallel to the X-axis) and that crosses the rectangular area 50. That is, as shown in FIG. 13, the inspection line of the non-contact two-dimensional sensor is set parallel to the X-axis. Since this control is performed after the angle has been calibrated, the straight line a4 is accurately parallel to the X-axis.

Next, as shown in FIG. 13, the height of the surface of the calibration area 40*a* is measured along the straight line a4 parallel to the X-axis (S13: see FIGS. 6A and 6B). In FIG. 14, the horizontal axis indicates the positions along the straight line a4 and the vertical axis indicates the heights. In FIG. 14, the solid line m1 is the line corresponding to the actually measured values. In the example shown in FIG. 13, the straight line a4 passes through the fourth corner area 50*d* and the third corner area 50*c*. In this case, the heights of the areas are measured in the order of the peripheral area 51, the fourth corner area 50*d*, the center area 50*e*, the third corner area 50*c*, and the peripheral area 51. FIG. 14 shows the case where the reference position in the X-axis direction is deviated. When the reference position in the X-axis direction is not deviated, the line corresponding to the measured values appears at the position indicated by the dotted line m2 in FIG. 14. That is, when the line m1 corresponding to the actually measured values deviates from the dotted line m2, the reference position in the X-axis direction is deviated.

For example, the boundary d1 between the peripheral area 51 and the fourth corner area 50*d*, and the boundary d2 between the peripheral area 51 and the third corner area 50*c*, are obtained along the straight line a4. After that, the midpoint dc is obtained as the midpoint between the boundary d1 and the boundary d2 (S14). Alternatively, the midpoint dc may be obtained by determining the boundary d3 between the fourth corner area 50*d* and the center area 50*e*, and the boundary d4 between the third corner area 50*c* and the center area 50*e*, along the straight line a4 and then by determining the midpoint between the boundary d3 and the boundary d4. Next, it is determined whether the position of the midpoint dc along the straight line a4 coincides with the position of the midpoint dc0 obtained when the reference position in the X-axis direction is not deviated. In other words, it is determined whether dc=dc0 (S15). In this case, if it is determined that dc=dc0 (Yes), the reference position in the X-axis direction is proper. In this case, the processing proceeds to the next process.

On the other hand, if it is determined that dc≠dc0 (No), the reference position in the X-axis direction is not proper. In this case, the reference position in the X-axis direction is calibrated. In the processing for calibrating the reference position in the X-axis direction (S16), dc−dc0 is calculated to find how much the position of the midpoint dc is deviated. Then, the reference position in the X-axis direction is calibrated so that dc−dc0=0. This processing (that is, the processing from S13 to S16) is repeated until it is determined that dc=dc0 (Yes) in the determination processing (S15).

Figure 15:
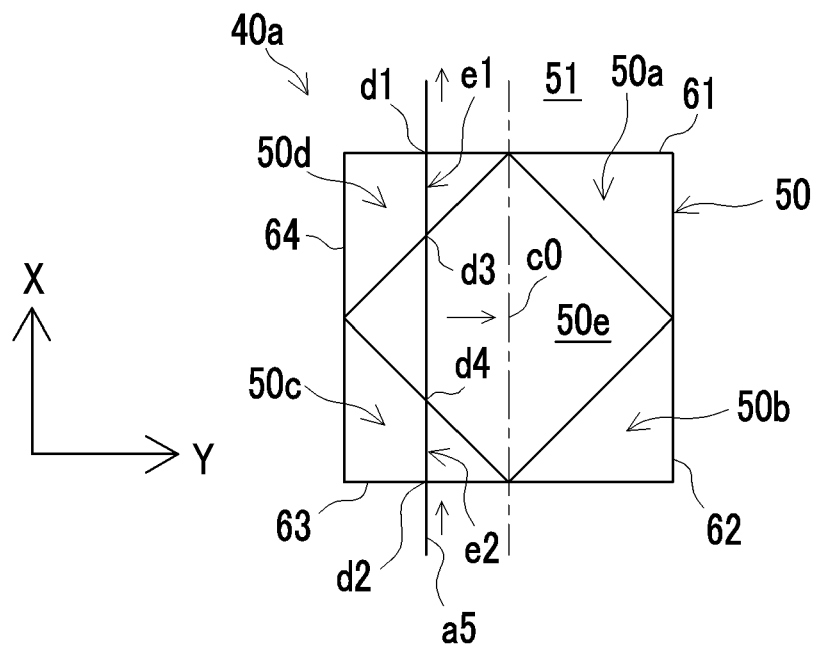
FIG. 15 is a plan view showing the measurement positions in the process of calibrating the reference position along the Y-axis as an example of such calibration.
Figure 16:
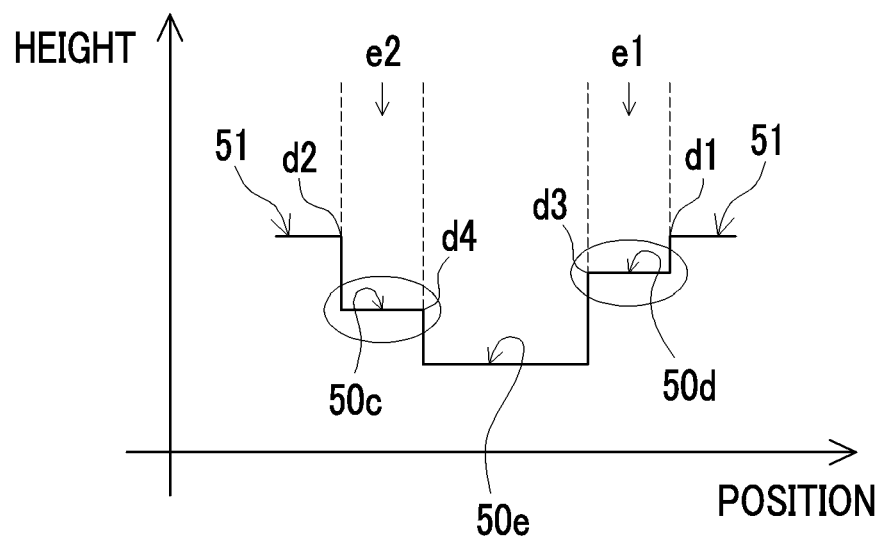
FIG. 16 is a graph showing the height of the surface of the calibration area 40a in the measurement.

Next, as the next process, the reference position in the direction orthogonal to the one side described above is calibrated. In this embodiment, the reference position in the Y-axis direction, orthogonal to the X-axis, is calibrated. FIG. 15 is a plan view showing, as an example of such calibration, the measurement positions in the process of calibrating the reference position along the Y-axis. FIG. 16 is a graph showing the height of the surface of the calibration area 40*a* in the measurement. The processing for calibrating the reference position along the Y-axis is performed after calibrating the reference position along the X-axis. In FIG. 16, the horizontal axis indicates the positions along the straight line a5 and the vertical axis indicates the heights.

The processing for calibrating the reference position along the Y-axis is performed in such a way that, as shown in FIG. 15, the height of the surface of the calibration area 40*a* is measured along one side 62 and across the rectangular area 50 while shifting the position into the direction orthogonal to the one side 62 (that is, into the Y-axis direction) (S17: see FIG. 6B). In the example shown in FIG. 15, the inspection line of the non-contact two-dimensional sensor is set parallel to the X-axis. The height of the surface of the calibration area 40*a* is measured along the X-axis direction in the rectangular area 50 while shifting the position, from the position crossing the fourth corner area 50*d*, the center area 50*e*, and the third corner area 50*c* along the X-axis direction toward the center c0 of the rectangular area 50, along the Y-axis direction orthogonal to the X-axis.

After that, based on the height of the surface of the calibration area 40*a*, distances e1 and e2, over which the straight line a5 crosses the corner areas 50*d* and 50*c* on both sides of the center area 50*e* in the rectangular area 50, are obtained (S18). The distance e1 across the corner area 50*d* is obtained, for example, from a boundary d1 between the peripheral area 51 and the fourth corner area 50*d* and a boundary d3 between the fourth corner area 50*d* and the center area 50*e*. The distance e2 across the third corner area 50*c* is obtained, for example, from a boundary d2 between the peripheral area 51 and the third corner area 50*c* and a boundary d4 between the third corner area 50*c* and the center area 50*e*.

After that, the search is made for a position where the distances e1 and e2 each become zero. Then, based on the position where the distances e1 and e2, over which the straight line a5 crosses the corner areas 50*d* and 50*c*, each become zero, the reference position in the Y-axis direction orthogonal to the X-axis is calibrated. More specifically, it is determined whether the distances e1 and e2 are each zero (S19). If it is determined that the distances e1 and e2 are each zero (e1=e2=0: Yes), the position should be stored as the reference position in the Y-axis direction orthogonal to the X-axis. If it is determined that the distances e1 and e2 are not zero (e1=e2=0: No), the position is shifted into the Y-axis direction (S20), the distances e1 and e2 are obtained (S18), and the search is made for a position where the distances e1 and e2 each become zero (S19). This processing should be repeated until it is determined that the distances e1 and e2 are each zero (e1=e2=0: Yes). If it is determined that the distances e1 and e2 are each zero (e1=e2=0: Yes), the series of calibration processing for the control in this embodiment is terminated.

In this embodiment, the calibration jig 40 is provided with the calibration areas 40*a* to 40*d* at the four corners on the surface that faces the hand 15. In each of the calibration areas 40*a* to 40*d*, it is possible to calibrate the control in the height, the control in the angle on the horizontal plane, the reference position in the X-axis direction, and the reference position in the Y-axis direction. Performing calibration at each of the calibration areas 40*a* to 40*d* improves the accuracy in the control of the hand 15 of the horizontal articulated robot 10. In addition, measuring the height of the surface of at least one of the calibration areas 40*a* to 40*d* of the calibration jig 40 allows the horizontal articulated robot 10 to be calibrated. The calibration processing for the horizontal articulated robot 10 can be executed sequentially using the program predetermined for the control device. This sequential execution leads to the efficient calibration of the horizontal articulated robot 10.

Although the rectangular area 50 is a square and the center area 50*e* is also a square in the calibration jig 40 described above, their shape is not limited to a square. FIGS. 17 to 20 are plan views showing modified examples of the calibration area 40*a* of the calibration jig 40.

As shown in FIG. 4, the calibration area 40*a* has the rectangular area 50 and the peripheral area 51. The rectangular area 50 has the center c0 at the predetermined position. The peripheral area 51 is set in the predetermined area around the rectangular area 50. The rectangular area 50 has the center area 50*e* that is set at the center and the four corner areas—the first corner area 50*a*, the second corner area 50*b*, the third corner area 50*c*, and the fourth corner area 50*d*— that are set at the four corners sequentially in the circumferential direction order.

The center area 50*e*, delimited from the first corner area 50*a*, the second corner area 50*b*, the third corner area 50*c*, and the fourth corner area 50*d* respectively by the boundaries 50*a*1, 50*b*1, 50*c*1, and 50*d*1, is provided in the center of the rectangular area 50. Furthermore, the center area 50*e* has line symmetry with respect to each of the two axes that pass through the center c0 of the rectangular area 50 and that are orthogonal to each other and are parallel to the sides on the boundary of the rectangular area 50. The first corner area 50*a*, the second corner area 50*b*, the third corner area 50*c*, the fourth corner area 50*d*, the center area 50*e*, and the peripheral area 51 have different predetermined heights (known height).

Figure 17:
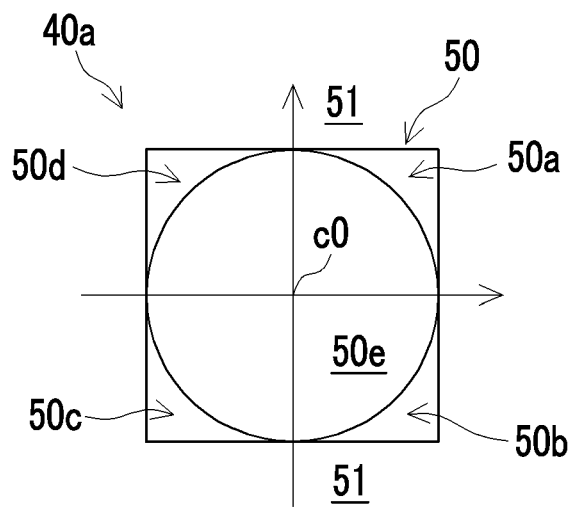
FIG. 17 is a plan view showing a modified example of the calibration area 40a of the calibration jig 40.

In the form shown in FIG. 17, the rectangular area 50 is a square, and the center area 50*e* is a circle inscribed in the rectangular area 50. The first corner area 50*a*, the second corner area 50*b*, the third corner area 50*c*, and the fourth corner area 50*d*, which are set sequentially in the circumferential direction at the four corners of the rectangular area 50, are formed each in a part included in the rectangular area 50 but not used for the center area 50*e*.

Figure 18:
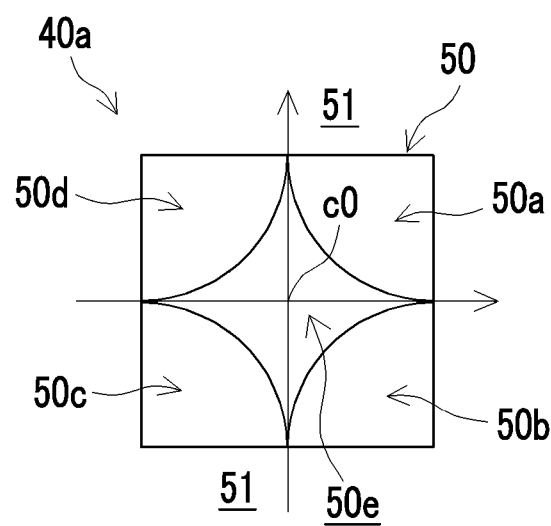
FIG. 18 is a plan view showing a modified example of the calibration area 40a of the calibration jig 40.

In the form shown in FIG. 18, the rectangular area 50 is a square, and the center area 50*e* is a circle inscribed in the rectangular area 50. The first corner area 50*a*, the second corner area 50*b*, the third corner area 50*c*, and the fourth corner area 50*d*, which are set sequentially in the circumferential direction at the four corners of the rectangular area 50, are formed in a sector included in the rectangular area 50 but not used for the center area 50*e*.

Figure 19:
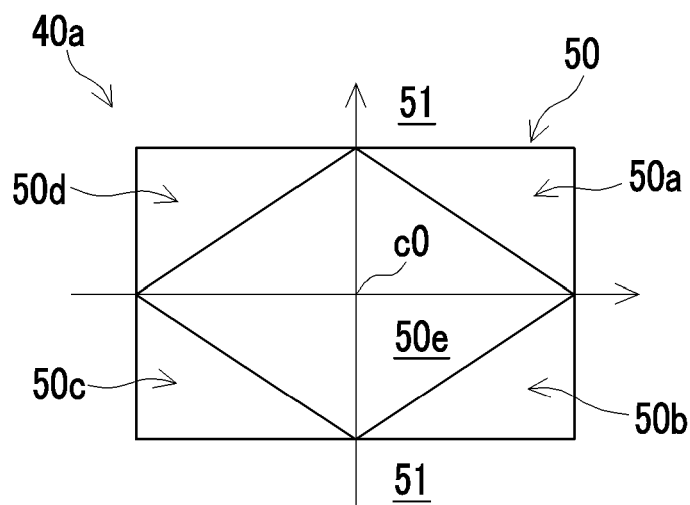
FIG. 19 is a plan view showing a modified example of the calibration area 40a of the calibration jig 40.
Figure 20:
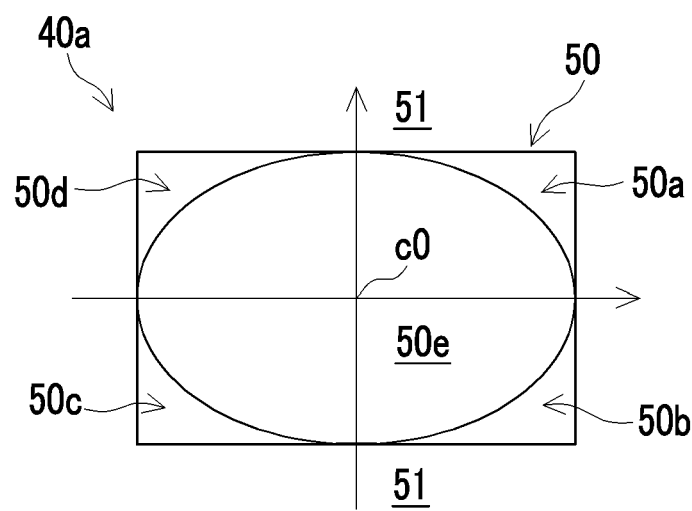
FIG. 20 is a plan view showing a modified example of the calibration area 40a of the calibration jig 40.

In the form shown in FIG. 19, the rectangular area 50 is a rectangle, and the center area 50*e* is a rhombus that has diagonal lines along two axes that pass through the center c0 of the rectangular area 50 and that are orthogonal to each other and are parallel to the sides. The first corner area 50a, the second corner area 50b, the third corner area 50c, and the fourth corner area 50d, which are set sequentially in the circumferential direction at the four corners of the rectangular area 50, are formed each in a triangle included in the rectangular area 50 but not used for the center area 50e. Furthermore, as shown in FIG. 20, it is also possible that the rectangular area 50 is a rectangle and the center area 50e is an ellipse that has the long axis and the short axis along two axes that are orthogonal to each other and are parallel to the sides. In this case, the first corner area 50a, the second corner area 50b, the third corner area 50c, and the fourth corner area 50d, which are set sequentially in the circumferential direction at the four corners of the rectangular area 50, are formed each in a part included in the rectangular area 50 but not used for the center area 50e.

In this manner, various shapes can be used for the rectangular area 50 of the calibration jig 40.

Although various forms of the calibration jig and the calibration method for the horizontal articulated robot proposed by the present disclosure have been described, the embodiments and examples given in this specification do not limit the present disclosure unless otherwise mentioned.

What is claimed is:

1. A calibration jig for a horizontal articulated robot comprising:
    a surface of the calibration jig facing the horizontal articulated robot, the surface including at least one calibration area at a predetermined position, wherein
    the calibration area has a rectangular area and a peripheral area, the rectangular area having a center at a predetermined position, the peripheral area being set in a predetermined area around the rectangular area,
    the rectangular area has a first corner area, a second corner area, a third corner area, a fourth corner area, and a center area,
    the first corner area, the second corner area, the third corner area, and the fourth corner area are sequentially set at four corners of the rectangular area in a circumferential direction,
    the center area is delimited from the first corner area, the second corner area, the third corner area, and the fourth corner area each by a boundary line, is provided in a center portion of the rectangular area, and has a line symmetry with respect to each of two axes, the two axes passing through the center of the rectangular area, the two axes being orthogonal to each other and parallel to sides on a boundary of the rectangular area, and
    the first corner area, the second corner area, the third corner area, the fourth corner area, the center area, and the peripheral area respectively have different predetermined heights.

2. The calibration jig for a horizontal articulated robot according to claim 1 wherein the rectangular area is a square.

3. The calibration jig for a horizontal articulated robot according to claim 1 wherein the center area is a rhombus that has diagonal lines along two axes that pass through the center and that are orthogonal to each other and are parallel to the sides.

4. The calibration jig for a horizontal articulated robot according to claim 2 wherein the center area is a circle.

5. The calibration jig for a horizontal articulated robot according to claim 2 wherein the first corner area, the second corner area, the third corner area, and the fourth corner area are each a sector.

6. The calibration jig for a horizontal articulated robot according to claim 1 wherein the rectangular area is a rectangle and the center area is an ellipse having a long axis and a short axis along two axes that are orthogonal to each other and are horizontal to the sides.

7. The calibration jig for a horizontal articulated robot according to claim 1 wherein in the calibration area, a height of the peripheral area is the highest and a height of the center area is the lowest.

8. A calibration method for a horizontal articulated robot including an articulated mechanism that includes an attachment unit for attaching a hand and a control device that controls a movement of the articulated mechanism, the calibration method comprising:
    preparing a calibration jig according to claim 1;
    arranging the calibration jig at a predetermined position with respect to the horizontally articulated robot;
    preparing a hand including a distance measuring sensor;
    attaching the hand to the attachment unit of the horizontal articulated robot;
    measuring a height of a surface of a calibration area with the distance measuring sensor by controlling the attachment unit with the control device; and
    calibrating control of the control device based on the height of the surface of the calibration area.

9. The calibration method according to claim 8 wherein
    when measuring the height of the surface of the calibration area, the height of the surface of the calibration area is measured so that the distance measuring sensor crosses at least a center area and a peripheral area of the calibration area and
    when calibrating the control of the control device, the center area or the peripheral area of the calibration area is identified and, based on a height of the center area or the peripheral area, a reference height is calibrated.

10. The calibration method according to claim 9, further comprising
    after calibrating the reference height, controlling the distance measuring sensor so that the height of the surface of the calibration area is measured along a straight line that crosses the calibration area at a predetermined angle; and
    calibrating control in the angle based on measured values measured by the distance measuring sensor in the controlling the distance measuring sensor.

11. The calibration method according to claim 10, further comprising
    after calibrating the control in the angle, controlling the distance measuring sensor so that the height of the surface of the calibration area is measured along a straight line that is parallel to one of sides on a boundary of the rectangular area and that crosses the rectangular area; and
    calibrating a reference position in a direction along the one of the sides based on measured values measured by the distance measuring sensor in the controlling the distance measuring sensor.

12. The calibration method according to claim 11, further comprising
    after calibrating the reference position in the direction along the one side, measuring the height of the surface of the calibration area across the rectangular area along the one side while shifting a position into a direction orthogonal to the one side and searching for a position where distances across the corner areas in the rectangular area and on both sides of the center area each become zero based on the height of the surface of the calibration area; and calibrating a reference position in a direction orthogonal to the one side based on the position where the distances across the corner areas each become zero.

13. The calibration method according to claim 8 wherein
in preparing the hand, the distance measuring sensor of the hand is a non-contact two-dimensional sensor that detects a shape of a measurement target along one straight line.

14. The calibration method according to claim 13 further comprising after calibrating the reference height and before calibrating the control in the angle, controlling the non-contact two-dimensional sensor so that the height of the surface of the calibration area can be measured along a straight line that crosses at least corner areas included in the rectangular area and arranged diagonally; and detecting an orientation of the non-contact two-dimensional sensor based on measured values measured by the non-contact two-dimensional sensor in the controlling the distance measuring sensor.

* * * * *